2,939,864
Patented June 7, 1960

2,939,864
PROCESS FOR PURIFICATION OF OIL-SOLUBLE ALCOHOLS BY HYDROGENATION AND UREA ADDUCTION

William H. Hopson, Shelby P. Sharp, and Alfred Steitz, Jr., Tulsa, Okla., assignors to Pan American Petroleum Corporation, Tulsa, Okla., a corporation of Delaware No Drawing. Filed Sept. 11, 1957, Ser. No. 683,229

5 Claims. (Cl. 260—96.5)

The present invention relates to a process for the purification of alcohols. More particularly it is concerned with a method for removing objectionable color forming impurities present in small amounts in the alcohols found in the hydrocarbon fraction produced by the reduction of carbon monoxide with hydrogen using an iron or equivalent catalyst.

Specifically, our invention involves subjecting an impure mixture of alcohols recovered from the oil fraction produced in hydrocarbon synthesis, to treatment with urea. In this process the urea selectively forms an adduct or complex with the straight chain alcohols leaving behind the branched chain and cyclic alcohols present in the original mixture. The adduct fraction thus produced is then isolated, decomposed to liberate the straight chain alcohols and the latter recovered. The surprising feature of our invention is that the alcohol fraction thus recovered is substantially free from objectionable color-forming impurities originally present in the aforesaid impure mixture.

The alcohols present in hydrocarbon synthesis oil range primarily from $C_5$ to $C_{10}$ in molecular weight and constitute a relatively large source of such alcohols, approximately 85 to 90 percent of which have eight or less carbon atoms. For example, a synthesis plant capable of producing 6,000 barrels per day of petroleum hydrocarbons will also produce about 93,000 pounds per day of oil-soluble alcohols in addition to about 225,000 pounds per day of other oil-soluble chemicals such as esters, acids and carbonyl compounds.

In recovering oil-soluble chemicals from hydrocarbon solutions thereof such as, for example, hydrocarbon solutions of the type produced by the reaction of carbon monoxide with hydrogen at elevated temperatures and pressures in the presence of a fluidized alkali promoted iron catalyst, it has been proposed that aqueous soap solutions of various types be employed as selective solvents or extractants for such chemicals. Generally these "soap" solutions are not composed of soaps in the ordinary sense but are made up largely of relatively nonsurface-active salts of alkali metals or equivalent salts derived from carboxylic acid mixtures having an average molecular weight ranging from about 115 to about 155. Solutions of this type are most conveniently prepared by adding the required amount of an aqueous caustic solution, or other suitable base, to the primary oil fraction produced in hydrocarbon synthesis whereby the free acids present in said fraction are neutralized. A substantial proportion of the oil-soluble chemicals, containing about 5 to 10 weight percent of hydrocarbons, is solubilized in the aqueous soap layer formed as a result of the neutralization step. The soap solution used for extraction purposes is prepared by subjecting the aqueous layer, containing the neutralized acids, chemicals and minor amount of hydrocarbons, to a stripping operation in which substantially all of the chemicals and all of the hydrocarbons were taken overhead leaving a lean aqueous soap solution having a soap or salt content of the order of 20 to about 50 percent.

In practice, after the hydrocarbon synthesis oil had been extracted with a lean aqueous soap solution, the resulting rich soap extract, containing oxygenated chemicals and hydrocarbons, was combined with the rich soap formed in the above-mentioned neutralization step. These combined streams were then subjected to extraction under pressure with a low molecular weight liquid hydrocarbon such as, for example, liquid propane or liquid butane, for the purpose of removing from the soap solution any dissolved heavy hydrocarbons. The presence of heavy hydrocarbons, generally speaking, is undesirable since they lower the purity of the chemicals recovered from such solutions. This step, involving extraction of the chemical-rich soap solutions, is ordinarily referred to as "de-oiling" or the "de-oiling step." The raffinate from the de-oiling step consisted chiefly of soap solution containing oxygenated organic chemicals free of heavy hydrocarbons. This solution was thereafter fractionated under pressure to separate the light hydrocarbon solvent present, after which the soap solution was stripped free of chemicals in a conventional bubble cap still. The chemical distillate was then topped under a pressure of about 150 mm. to remove light chemicals, i.e., boiling below about 115° F. and containing primarily methyl ethyl ketone, methyl propyl ketone, and propanol.

The alcohol mixtures obtained from the above-mentioned de-oiled soap extract are generally satisfactory in their initial color. However, we have found that they do not meet the required color specifications when used, for example, in the preparation of phthalate plasticizers. Such alcohols which are initially of good color tend to darken during esterification with phthalic anhydride and mineral acid catalyst. The exact nature of the color forming impurities in these alcohols is not known. Some of the materials causing this trouble are thought to be unsaturates of various types and carbonyl compounds having boiling points too close to those of the alcohols to effect a satisfactory separation by distillation. Numerous carbonyl complexing agents have been used without success in an effort to improve the phthalation color quality of these alcohols. In addition, the alcohol mixtures obtained by further careful fractionation of the distillate produced from fractionation of the aforesaid soap extract have been subjected to treatment with sulfuric and phosphoric acids and digested with caustic in an effort to improve the color quality of said alcohols. Such methods, however, have been entirely unsatisfactory. Also hydrogenation of the alcohols or treatment with reagents active to destroy carbonyl compounds such as, for example, N-hydroxylbenzenesulfonamide, sodium borohydride, hydroxylamine hydrochloride, and potassium permanganate, have likewise been unsuccessful.

Accordingly, it is an object of our invention to provide a procedure for recovering preferentially oil-soluble alcohols of good phthalation color from the oil fraction produced in hydrocarbon synthesis. Another object of our invention is to provide a method for recovering normal $C_8$ to $C_{10}$ alcohols of high color quality, particularly the $C_8$ and $C_9$ normal alcohols, since such alcohols, insofar as we are aware, have no other commercial source. It is another object of our invention to remove objectionable color-forming impurities from the preferentially oil-soluble alcohols, produced during hydrocarbon synthesis, by a technique known as urea adduction.

Briefly, the process of our invention involves first adding the alcohol fraction to be purified to a molar excess of finely ground urea which has been previously moistened with water. Typically the molar ratio of urea to alcohol fraction used may range from about 12 to about 15:1. The water used to moisten the urea serves as a promoter to the adduction or complex formation involving the straight chain alcohols and urea. The molar ratio of urea to water is typically 3 or 4:1. When the impure alcohol fraction is added to the moistened urea in the presence of agitation, an increase in temperature, usually 5 to 10° C., is observed. A fraction high in branched chain alcohols gives a relatively low temperature rise. The degree of dampness of the adduct formed depends on the branching of the alcohols adducted. A highly branched alcohol gives an adduct which is wet in appearance while a fraction high in normal alcohol content yields an adduct having a dry appearance.

After initial reaction occurs, the resulting mixture may, if desired, be allowed to stand for a period of several hours to permit formation of the adducts to proceed to completion. The necessity of such a period is not accurately known; however, it is thought, in general, better results are obtained, particularly if the mixture being treated is quite impure and contains a substantial portion of branched chain alcohols. Thereafter the reaction mixture is filtered and the resulting crystals of separated adduct washed with a cold liquid light hydrocarbon such as, for example, isopentane, to remove occluded branched alcohols and other impurities. The washings are collected and saved for subsequent processing. The washed adduct crystals are then dried under vacuum to remove any entrained hydrocarbon. Thereafter the adduct is transferred to a relatively large volume of water, preferably distilled water, and the mixture agitated in the presence of heat (e.g. 60° to 80° C.) for five or ten minutes, after which it is allowed to stand. Liberated normal alcohol rises to the top to form an oily layer and is recovered. The light hydrocarbon washings previously referred to contain branched chain alcohols. The hydrocarbon is driven off by simple distillation and the residual alcohols are then washed with water to dissolve out any urea present. The branched chain alcohols are recovered in the form of a top layer.

The normal alcohols isolated from the adduct are dried by adding a suitable alcohol which readily azeotropes with water, such as isopropyl alcohol, and the resulting mixture fractionated. Selected cuts of the fractionated alcohol can then be tested for phthalation quality by means of an accepted method developed for isooctyl alcohol. This method is as follows: to a 5 ml. sample of the alcohol in a large open test tube is added 2.3 g. phthalic anhydride and 0.02 ml. of a mixture of 50 volume percent water and 50 volume percent concentrated sulfuric acid. The test tube is heated in an aluminum block at 125° C. for 90 minutes, stirring with a clean, dry stirring rod at the start to dissolve the anhydride and mix the solution. After 90 minutes the product is cooled, diluted with 5 ml. of acetone, and the APHA color of the diluted product determined.

The process of our invention will be further illustrated by the following specific example:

EXAMPLE

The feed stock used in the series of runs shown below was obtained from a de-oiled soap extract formed by extraction of hydrocarbon synthesis oil with an aqueous soap solution. The resulting soap extract was de-oiled, as generally outlined above, distilled and the resulting overhead of chemicals further fractionated at 90° to 170° C. and about 180 to 355 p.s.i., until substantially all of the methyl propyl ketone present in the overhead had been taken over as distillate. The still residue was next hydrogenated at about 188° C. and at about 2,000 p.s.i.g. hydrogen pressure in the presence of about 0.4 weight percent of a nickel hydrogenation catalyst. Reduction was discontinued after four hours. Thereafter the reduced mixture was distilled and separated into $C_8$, $C_9$ and $C_{10}$ fractions. Prior to urea adduction, these individual fractions had a color of 2,000–2,500 APHA (color standard of American Public Health Association). Alcohols or alcohol mixtures having a color of not more than 200 APHA are required to produce phthalates or plasticizers of suitable color quality. The conditions used in obtaining the data appearing in the table below were essentially the same as those generally outlined above:

Table I

| Run No. | 1 Normal $C_8$ | 2 Normal $C_9$ | 3 Normal $C_{10}$ |
| --- | --- | --- | --- |
| Gram mols urea | 15.0 | 15.0 | 15.0 |
| Gram mols $H_2O$ | 4.5 | 4.5 | 4.5 |
| Gram mols alcohol | 1.0 | 1.0 | 1.0 |
| Normal alcohols isolated from hydrogenated extract product, wt. percent | 28.4 | 39.1 | 37.7 |
| Total alcohols charged isolated by fractionation as 200 APHA or less phthalation, wt. percent | 7.1 | 18.8 | 18.9 |

From the aforesaid description it will be seen that a novel method for the removal of objectionable color-forming impurities from high molecular weight alcohols produced in hydrocarbon synthesis, has been provided. Although urea adduction for the purpose of separating alcohols of different molecular structure was previously known, it is considered highly unexpected that such treatment would result in providing alcohols of good phthalation quality. This is for the reason that we had previously tried numerous purification procedures without success. Similarly, the prior art teaches methods that are ineffective on this particular mixture of alcohols.

We claim:

1. In a process for the recovery of normal alcohols from a mixture of $C_8$ to $C_{10}$ normal and branched alcohols derived from hydrocarbon synthesis oil and containing objectionable color forming impurities including unsaturated materials, the improvement which consists of first subjecting said mixture to hydrogenation and thereafter adding urea to the resulting hydrogenated mixture to form a urea adduct of said normal alcohols, recovering said adduct, decomposing the latter to liberate said alcohols and recovering product normal alcohols having a color of not more than about 200 APHA.

2. In a process for the recovery of normal alcohols from a mixture thereof with a branched chain alcohol derived from hydrocarbon synthesis oil and containing objectionable color forming impurities including unsaturated materials, the improvement which consists of first subjecting said mixture to hydrogenation and thereafter adding urea to the resulting hydrogenated mixture to form a urea adduct of said normal alcohols, recovering said adduct and decomposing it to liberate said normal alcohols, and thereafter subjecting the latter to distillation to obtain an overhead alcohol product having a color of not more than about 200 APHA.

3. The process of claim 2 in which the normal alcohol is a normal $C_8$ alcohol.

4. The process of claim 2 in which the normal alcohol is a normal $C_9$ alcohol.

5. The process of claim 2 in which the normal alcohol is a normal $C_{10}$ alcohol.

References Cited in the file of this patent

UNITED STATES PATENTS

| | | |
| --- | --- | --- |
| 1,684,640 | Schmidt et al. | Sept. 18, 1928 |
| 2,059,495 | Smeykal | Nov. 3, 1936 |
| 2,525,354 | Hoog et al. | Oct. 10, 1950 |
| 2,569,671 | Hughes | Oct. 2, 1951 |
| 2,606,211 | Royer et al. | Aug. 5, 1952 |
| 2,663,703 | Dinerstein | Dec. 22, 1953 |
| 2,675,401 | Laemmle | Apr. 13, 1954 |
| 2,681,335 | Gorin | June 15, 1954 |
| 2,737,508 | Axe | Mar. 6, 1956 |
| 2,762,830 | Barnard | Sept. 11, 1956 |
| 2,810,740 | Grekel et al. | Oct. 22, 1957 |